(12) United States Patent
Binder et al.

(10) Patent No.: US 10,086,810 B2
(45) Date of Patent: Oct. 2, 2018

(54) METHOD AND BRAKING CONTROL DEVICE FOR STABILIZING A VEHICLE COMBINATION

(71) Applicant: WABCO GmbH, Hannover (DE)

(72) Inventors: Hartmut Binder, Hannover (DE); Thomas Lenz, Lehrte (DE); Dirk Wohltmann, Barsinghausen (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 15/500,101

(22) PCT Filed: May 22, 2015

(86) PCT No.: PCT/EP2015/001048
§ 371 (c)(1),
(2) Date: Jan. 30, 2017

(87) PCT Pub. No.: WO2016/015793
PCT Pub. Date: Feb. 4, 2016

(65) Prior Publication Data

US 2017/0259794 A1    Sep. 14, 2017

(30) Foreign Application Priority Data

Jul. 31, 2014  (DE) .................. 10 2014 011 500

(51) Int. Cl.
*B60T 8/17* (2006.01)
*B60T 8/172* (2006.01)
(Continued)

(52) U.S. Cl.
CPC ............ *B60T 8/1708* (2013.01); *B60T 8/172* (2013.01); *B60T 8/1755* (2013.01); *B60T 8/72* (2013.01);
(Continued)

(58) Field of Classification Search
CPC ............ B60T 2201/09; B60T 2230/06; B60T 8/1708; B60T 8/172; B60T 8/1755; B60T 8/72
(Continued)

(56) References Cited

U.S. PATENT DOCUMENTS 6,196,640 B1    3/2001  Stender
6,966,613 B2 *  11/2005 Davis .................. B60T 7/08
                                            303/20

(Continued)

FOREIGN PATENT DOCUMENTS

DE    10144299 A1    6/2003
DE    20315755 U1    12/2003
(Continued)

*Primary Examiner* — Tyler J Lee
(74) *Attorney, Agent, or Firm* — Leydig, Voit & Mayer, Ltd.

(57) ABSTRACT

A method for stabilizing a vehicle combination including a towing vehicle and at least one trailer vehicle includes determining wheel revolution rates of a driven axle of the towing vehicle and a vehicle speed of the towing vehicle, checking, as a first criterion, whether there is braking wheel slip at the driven axle of the towing vehicle without the operation of a wheel brake of the driven axle of the towing vehicle, and actuating, in response to the first criterion being met, at least one wheel brake of the trailer vehicle.

8 Claims, 4 Drawing Sheets

(51) Int. Cl.
*B60T 8/72* (2006.01)
*B60T 8/1755* (2006.01)

(52) U.S. Cl.
CPC ....... *B60T 2201/09* (2013.01); *B60T 2230/06* (2013.01)

(58) Field of Classification Search
USPC .......................................................... 701/71
See application file for complete search history.

(56) References Cited

U.S. PATENT DOCUMENTS

| | | | |
|---|---|---|---|
| 7,731,302 B2 * | 6/2010 | Tandy, Jr. ............. | B60T 8/1708 303/124 |
| 7,734,405 B2 * | 6/2010 | Tandy, Jr. ................. | B60T 7/20 180/204 |
| 7,798,263 B2 * | 9/2010 | Tandy, Jr. ............. | B60T 8/1708 180/14.6 |
| 8,165,768 B2 * | 4/2012 | Leschuk .................. | B60T 7/12 303/123 |
| 8,700,285 B2 * | 4/2014 | Barlsen .................. | B60Q 1/305 340/431 |
| 8,838,353 B2 * | 9/2014 | Wu ........................ | B60D 1/245 180/14.1 |
| 9,020,729 B2 * | 4/2015 | Maitlen ................. | B60T 8/1701 701/70 |
| 9,031,754 B2 * | 5/2015 | Matoy ................... | B60T 8/1708 701/70 |
| 9,199,640 B2 * | 12/2015 | Weston ................. | B60W 10/16 |
| 9,573,589 B2 * | 2/2017 | Tagesson ............... | B60T 8/1755 |
| 2003/0117011 A1 * | 6/2003 | Ackley ................. | B60T 13/686 303/7 |
| 2004/0148085 A1 | 7/2004 | Heuer | |
| 2004/0183372 A1 | 9/2004 | Heuer et al. | |
| 2005/0011693 A1 | 1/2005 | Horn et al. | |
| 2008/0177454 A1 * | 7/2008 | Bond .................... | B60T 8/1708 701/70 |
| 2010/0152989 A1 * | 6/2010 | Smith ....................... | B60T 7/20 701/78 |
| 2010/0304929 A1 | 12/2010 | Hilberer | |
| 2014/0343813 A1 * | 11/2014 | Morselli ............... | B60T 8/1708 701/70 |
| 2015/0336548 A1 * | 11/2015 | Morselli ............... | B60T 8/1708 701/70 |

FOREIGN PATENT DOCUMENTS

| | | |
|---|---|---|
| DE | 10311838 A1 | 10/2004 |
| DE | 102004036089 A1 | 2/2006 |
| DE | 102007023345 A1 | 11/2008 |
| DE | 102009031851 A1 | 1/2011 |
| DE | 102010019433 A1 | 11/2011 |
| EP | 0914998 B1 | 5/1999 |
| EP | 1167141 B1 | 1/2002 |
| EP | 1439103 A1 | 7/2004 |
| EP | 2384941 A1 | 11/2011 |
| EP | 2664506 A1 | 11/2013 |
| WO | WO 2007139488 A1 | 12/2007 |
| WO | WO 2013004315 A1 | 1/2013 |

\* cited by examiner

METHOD AND BRAKING CONTROL DEVICE FOR STABILIZING A VEHICLE COMBINATION

CROSS REFERENCE TO RELATED APPLICATIONS

This application is a U.S. National Stage Application under 35 U.S.C. § 371 of International Application No. PCT/EP2015/001048 filed on May 22, 2015, and claims benefit to German Patent Application Nos. DE 10 2014 011 500.3 filed on Jul. 31, 2014. The International Application was published in German on Feb. 4, 2016 as WO 2016/015793 A1 under PCT Article 21(2).

FIELD

The invention concerns a method and a brake control device for stabilizing a vehicle combination that is made up of a towing vehicle and at least one trailer vehicle.

BACKGROUND

With vehicle combinations, instability can occur if the total braking effect of the towing vehicle is greater than that of the trailer vehicle; in this case the vehicle combination can buckle laterally for example. Braking processes of a vehicle combination are therefore in general designed so that the individual vehicles are braked substantially equally.

DE 10 2009 031 851 A1 describes a method for braking a towing vehicle-trailer combination, whereby in a vehicle state with the service brake not operated a trailer pushing the towing vehicle is detected and on reaching and exceeding a prescribed thrust by the trailer, the brake system of the trailer is operated automatically with the service brake of the towing vehicle not operated in order to exert a stabilizing braking effect on the trailer. The thrust by the trailer is determined from a difference or the quotient of the actual engine revolution rate of the towing vehicle and a predetermined target engine revolution rate, i.e. from an increase in the engine revolution rate of the towing vehicle and thereby an engine braking effect, and the trailer is then deliberately decelerated.

DE 203 15 755 U1 describes a brake system in which advanced braking of an overrun brake of the trailer is allowed on releasing the gas pedal of the towing vehicle.

EP 0 914 998 B1 describes a method for matching braking forces between a towing vehicle and a trailer vehicle with which respective speeds of the parts of the vehicle are determined from slip-affected wheel revolution rate signals of the towing vehicle-trailer vehicle and a difference between the time derivatives of the determined speeds of the parts of the vehicle is determined and compared with a limit value, whereby at least one brake control value is changed on exceeding the limit value.

EP 1 439 103 A1 describes a vehicle dynamics control system in which different vehicle dynamic signals from numerous sensors are determined, and on determining unstable driving behavior the brake system of the towing vehicle can be operated, or a braking demand signal is also output to the trailer vehicle.

DE 103 11 838 A1 focuses on determining the danger of a rollover of a vehicle combination, whereby wheel revolution rate signals of the trailer vehicle are used.

EP 1 167 141 B1 describes a method for preventing vehicle instabilities in a vehicle combination, with which a difference between the driver's intended course and the actual driving movement is detected in the form of a yaw angle and a braking demand signal may be output to a trailer rear axle.

DE 101 44 299 B4 describes a further method for stabilizing a vehicle combination, with which a trailer brake pressure can be reduced or cyclically modulated in the event of instability.

DE 10 2004 036 089 A1 describes a method for attenuating yaw oscillations of a trailer by operating individual wheel brakes or all wheel brakes of the trailer.

SUMMARY

In an embodiment, the present invention provides a method for stabilizing a vehicle combination including a towing vehicle and at least one trailer vehicle. The method includes determining wheel revolution rates of a driven axle of the towing vehicle and a vehicle speed of the towing vehicle, checking, as a first criterion, whether there is braking wheel slip at the driven axle of the towing vehicle without the operation of a wheel brake of the driven axle of the towing vehicle, and actuating, in response to the first criterion being met, at least one wheel brake of the trailer vehicle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Many prior art methods for braking a vehicle combination that is made up of a towing vehicle and at least one trailer vehicle are quite complex and require the analysis of a number of sensor signals or complex brake control interventions.

A method and a brake control device for stabilizing a vehicle combination are described herein that can reduce instabilities, in particular caused by trailer vehicle thrust.

In an embodiment of the invention, according to a first criterion a deceleration of the towing vehicle is thereby determined that results from braking wheel slip of the wheels of the at least one driven axle of the towing vehicle without operation of the wheel brakes or service brakes of said at least one driven axle. On detecting such a deceleration of the towing vehicle that is not due to wheel braking, possibly depending on further criteria, the trailer vehicle is braked, i.e. a braking demand signal is output to the trailer vehicle for the operation of the wheel brakes of the trailer vehicle, in order to stabilize the vehicle combination thereby. The stabilization is thus carried out advantageously by a reduction of the thrust and/or forming a pulling effect or braking force of the trailer vehicle on the towing vehicle.

Thus, the non service-braked deceleration of the towing vehicle alone is determined from the wheel revolution rates of the towing vehicle and the vehicle speed of the towing vehicle, whereby the vehicle speed is determined as an internal reference speed, for example a controller-internal speed, in any case from the wheel revolution rates of the towing vehicle and is thereby available. In addition, a speed can also be included in further data, for example from the GPS as it is known.

Therefore, in particular more complex considerations of the wheel revolution rates or wheel slip of the trailer vehicle are omitted. The thrust of the trailer vehicle on the towing vehicle can thus be fully determined from data or signals of the towing vehicle, for example as a braking overrun mode or as an engine braking effect.

The engine braking effect can also be additionally determined from data of the towing vehicle, in particular where there is a retarder that enables braking by means of the drive train, i.e. the drive shaft on the driven axle; here the engine braking signal or retarder signal can be used in addition. Furthermore, in general data from the engine control unit can also be used in order to check for an engine braking effect. Such measures are however basically unnecessary.

For determining that there is no operation of the wheel brakes on the driven axle, for example the brake light signal that is available in the vehicle can be used, or even a pressure signal of an internal pressure sensor of the brake system that detects the driver's braking demand.

The braking wheel slip of the wheels of the driven axle of the towing vehicle is advantageously carried out by a comparison of the speed of the towing vehicle with a wheel speed determined from the wheel revolution rate and/or by a wheel slip analysis of the vehicle using the wheel revolution rates of the driven axle and a further axle of the towing vehicle.

There is thus braking wheel slip on the driven axle of the towing vehicle, i.e. the wheels of the driven axle, if a wheel speed lies below the speed of the vehicle, whereby the wheel speed corresponds to the speed of the vehicle during slip-free driving.

Furthermore, for safety reasons a brake control intervention on the trailer vehicle can be excluded, for example during active intervention by a drive slip controller, or even by a stability system, in order not to cause a disturbing influence by a braking effect of the trailer. With a further form of the invention, the slope of the highway can be used; thus, when driving uphill, i.e. with a positive gradient of the highway, it can be provided to exclude braking of the trailer vehicle because in such a case there is already a braking effect of the trailer. Here the exclusion can in particular be carried out depending on the gradient of the highway and the driving speed.

Furthermore, when driving downhill it can additionally be provided to also operate the trailer brakes in the absence of a non-operationally restricted deceleration.

An embodiment of the invention can in principle be implemented for vehicles with a drive only on the rear axle, only on the front axle or even on numerous axles. It can furthermore be implemented for trailer vehicles with only a pneumatic coupling to the towing vehicle or even for trailer vehicles with a dedicated trailer brake control device and a pneumatic and electronic coupling to the towing vehicle.

Figure 1:
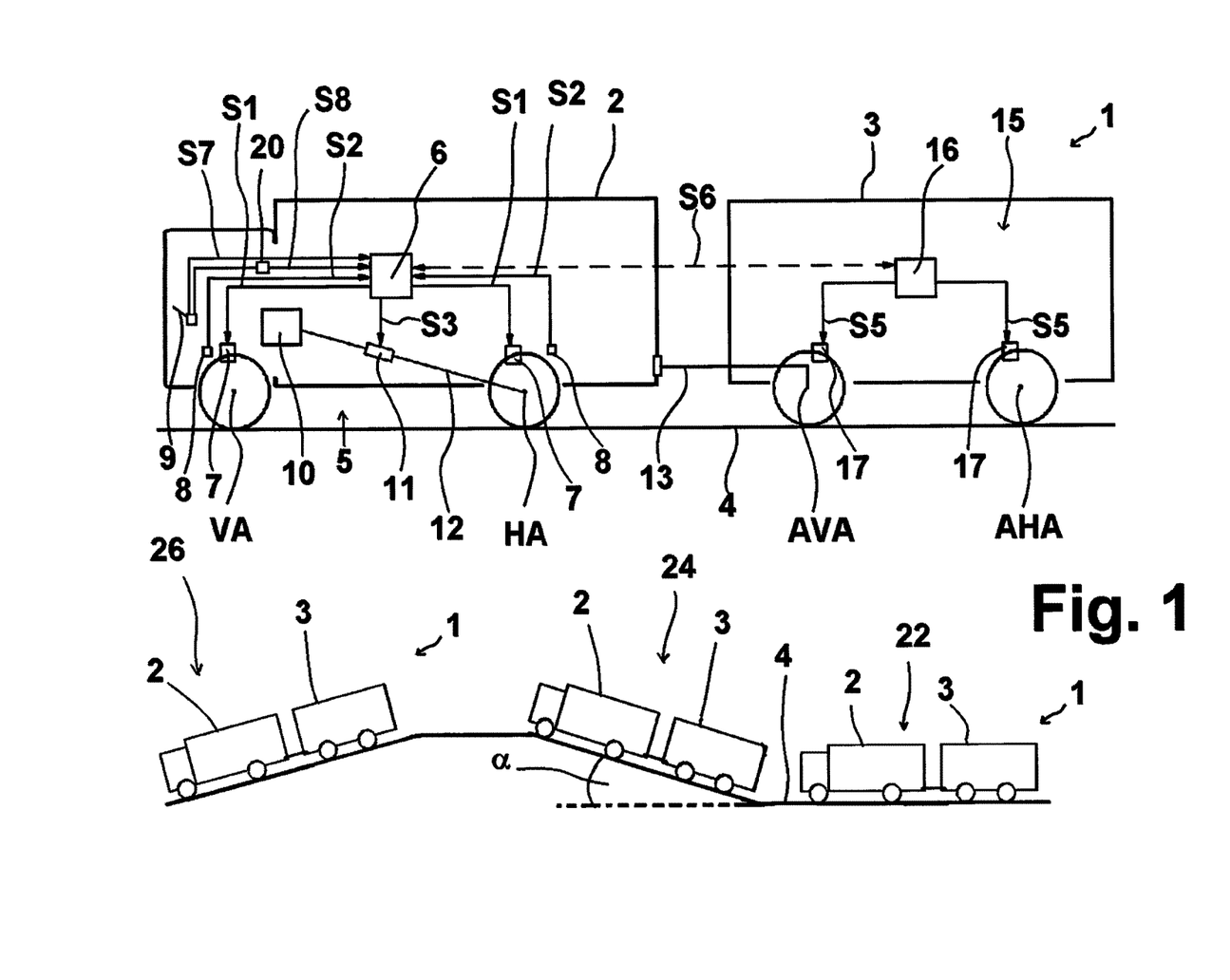
FIG. 1 shows a vehicle combination using an embodiment of the invention in a side view, including illustrating different highway gradients.
Figure 2:
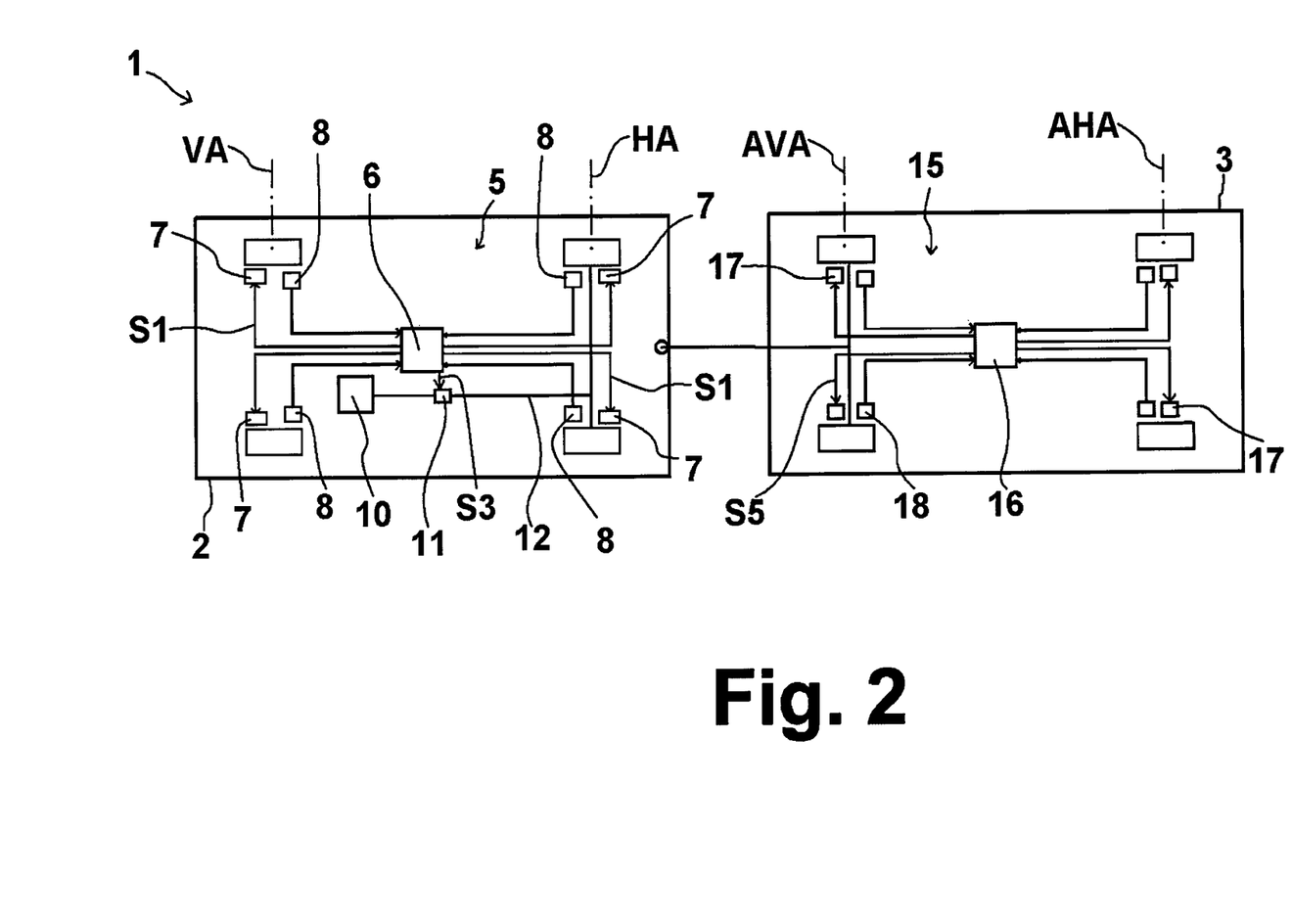
FIG. 2 shows a top view of the vehicle combination of FIG. 1.

FIG. 1 shows a vehicle combination using an embodiment of the invention in a side view, including illustrating different highway gradients, and FIG. 2 shows a top view of the vehicle combination of FIG. 1. A vehicle combination 1 is made up of a towing vehicle 2 and a trailer vehicle 3 and is travelling on a highway 4. The towing vehicle 2 comprises a front axle VA with front wheels VA-1 and VA-2 and a driven rear axle HA with rear wheels HA-1 and HA-2, furthermore a towing vehicle brake system 5 with a brake control device 6, wheel brakes 7 actuated by the brake control device 6 by brake control signals S1, wheel revolution rate sensors 8 and possibly further components, for example according to FIG. 1 the driver-operated brake pedal 9. The wheel revolution rate sensors 8 output wheel revolution rate signals S2 to the brake control device 6. Furthermore, the towing vehicle 2 comprises an engine-gearbox unit 10 that drives the wheels HA-1 and HA-2 of the rear axle HA by means of a drive shaft 12. Here a retarder 11 is provided, which can be directly or indirectly actuated by the brake control device 6. The brake control device 6 can thereby actuate the retarder 11 (or the retarder control device thereof that is not shown in detail here) by means of engine braking control signals S3; furthermore, the brake control device 6 can receive status signals for the engine-gearbox unit 10 from the engine control unit thereof.

The trailer vehicle 3 comprises a trailer front axle AVA, a trailer rear axle AHA with for example two wheels in each case and furthermore a trailer brake system 15 with trailer wheel brakes 17. The trailer brake system 15 can for example be of a pneumatic form and can be actuated pneumatically, or can even comprise trailer wheel revolution rate sensors 18 and a dedicated trailer brake control device 16, according to the towing vehicle 2. With such a design, the trailer brake control device 16 outputs trailer brake control signals S5 to the trailer wheel brakes 17. There is then an exchange of signals in a known way between the brake control device 6 and the trailer-brake control device 16; in particular braking demand signals S6 are output by the brake control device 6 to the trailer brake control device 16.

The brake control device 6 and—if provided as with this embodiment, also the trailer brake control devices 16—can for example be an ABS control unit or even an EBS control unit. In principle, different driving stability controllers can be accommodated in the brake systems 5 and 15, i.e. besides an ABS, for example also an ESP (Electronic Stability Program) or an ESC or an RSS controller.

The trailer vehicle 3 is shown here as a drawbar trailer; it can also be a semi-trailer for example. Furthermore, the trailer vehicle 3 can be a single-axis trailer for example. In principle, for example the towing vehicle 1 can also have still further axles in addition to the front axle VA and the rear axle HA, for example two rear axles or a lift axle.

The brake control device 6 thus receives the wheel revolution rates n_VA of the front axle VA and the wheel revolution rates n_HA of the rear axle HA by means of the wheel revolution rate signals S2; respective separate wheel revolution rates are hereby determined accordingly for the individual wheels HA-1, HA-2, VA-1, VA-2, i.e. left and right, whereby in principle common wheel revolution rates n_HA of the rear axle HA and common wheel revolution rates n_VA of the front axle VA can be assumed initially for the description of the method.

The method according to the invention can be carried out by the brake control device 6 and/or trailer-brake control device 16. An embodiment is described below in which the method is carried out in the brake control device 6.

The brake control device 6 can also obtain additional driving dynamics variables of the towing vehicle 2, for example from a data bus that is within the vehicle, or can determine said variables independently. From the wheel revolution rates n_VA and n_HA, the brake control device 6 can determine a controller internal reference speed in a known way and use it as the vehicle speed v; furthermore, the brake control device 6 can also additionally or alternatively determine or use the vehicle speed v from a navigation system or other vehicle-specific sources.

The brake control device 6 determines whether it is the case that at least a first criterion K1 is met, according to which the following conditions are met on the driven axle HA of the towing vehicle 2: first condition K1a: there is a braking, i.e. decelerating, wheel slip s_HA on the left rear wheel HA-1 and/or the right rear wheel HA-2; second condition K1b: there is no operation of a wheel brake (17) of the left rear wheel HA-1 and/or of the right rear wheel HA-2.

Furthermore, the first criterion K1 preferably comprises the following conditions: third condition K1c: there is no wheel slip s_VA on the front wheels VA-1 and VA-2 of the non-driven front axle VA; fourth condition K1d: there is a vehicle deceleration, i.e. dv/dt<0.

For K1a: a braking wheel slip s_HA means that the wheel speed vr of the wheels involved, thus in this case the rear wheels HA-1 and HA-2, is lower than the vehicle speed v, i.e. vr<v. In any case, the condition K1a can also include that the braking wheel slip s_HA of the rear axle HA exceeds a minimum value or a limit value gs, so that the method is not used too soon or too often.

K1b: means S1=0, whereby other signals can also be used, for example the presence of a brake light signal S7 or the presence of a driver's braking demand, which for example can be determined by a pressure measurement with the aid of an internal pressure sensor 20 of the brake system 5 of the towing vehicle 2 as a braking demand signal S8.

K1c: this condition can additionally be used and means for example that s_VA is smaller than a second slip threshold value gs2 (slip threshold value of the non-driven axle, here the front axle VA), i.e. s_VA<gs2. Advantageously, K1c can also include a comparison of the wheel slip on the front axle VA and the rear axle HA, i.e. a check is made as to whether the slip at the rear axle HA is greater than that at the front axle VA, i.e. s_VA<s_HA.

K1d is likewise only optional, because the gradient α of the highway 4, i.e. in particular according to the representation in FIG. 1 at the bottom, driving on the level 22, driving uphill 24 or driving downhill 26, which can be determined by separate criteria, can affect the measured deceleration. Thus, it can be decided that driving uphill 24 is taking place if the gradient α exceeds a gradient threshold α_sw1, and that downhill travel 26 is taking place if the magnitude of the gradient exceeds a second gradient threshold, in particular a slope limit α_sw2.

Subsequently, it is advantageously determined whether an exclusion criterion K2 is met that can have one or more exclusion conditions K2a, K2b. In the presence of the exclusion criterion K2, the trailer vehicle 3 is not braked. A first exclusion condition K2a is whether driving uphill 24 is taking place; this can be determined from map data, but for example also using a longitudinal acceleration sensor, whereby dynamic longitudinal accelerations, i.e. dv/dt, are taken into account however. Furthermore, a second exclusion condition K2b can check for the presence of active driving dynamics control, i.e. the second exclusion condition K2b is met if driving dynamics control is active, so that the active driving dynamics control, such as ESP or ABS, but also a drive slip controller ASR, even in phases in which the wheel brakes 7 are not being operated, is not adversely affected by the braking of the trailer vehicle 3. The exclusion conditions K2a, K2b are advantageously combined in an OR condition, so that the exclusion criterion K2 is met if an exclusion condition K2a and/or K2b is present.

The brake control device 6 thus determines a deceleration by the engine-gearbox unit 10 and/or the retarder 11, i.e. by means of the drive train and the drive shaft 12 on the driven rear axle HA, using the first criterion K1. Instead or additionally, an engine braking effect can also be determined directly as a third criterion K3. The third criterion K3 can also use further available signals or data related to engine braking. In particular, a check can be made as to whether S3=1, i.e. an engine braking demand was made; furthermore, engine controller data can also be acquired, from which, together with data regarding a gear selection or gearbox setting, a revolution rate of the drive shaft 12 can be concluded.

The first criterion K1 and the third criterion K3 can thereby be carried out alternatively, or purely for safety reasons known braking of the trailer vehicle 3 is carried out on meeting the third criterion K3 in order to prevent subsequent instabilities in advance.

If the first criterion K1 is met and the exclusion criterion K2 is not met, the brake control device 6 outputs a signal S6 to the trailer brake control device 16, so that said trailer brake control device 16 brakes the trailer wheel brakes 17 of one or more trailer axles, i.e. the wheel brakes 17 of the trailer front axle AVA and/or the trailer rear axle HAA, by means of trailer brake control signals S5. By said braking of the trailer vehicle 3, the towing vehicle 2 is also braked via of the trailer coupling 13. Furthermore, stabilization of the vehicle combination 1 is achieved.

Furthermore, the engine-gearbox unit 10 can also be actively actuated or controlled by the brake control device 6, in order for example to achieve a larger drive torque in order to at least reduce the instability owing to the trailer vehicle 3 pushing from the rear or the engine braking effect. Here, however, other control systems can have priority, for example an automatic cruise control system ACC or a cruise control function CC, so that no dangerous driving situations are caused by an increase of the drive torque.

Furthermore, the gradient of the highway 4 can be incorporated in order to initiate active braking. It is thus detected that on a downslope, i.e. during downhill travel 26, an instability can already occur for low slip or no slip s_HA of the rear wheels HA-1 and HA-2 as a result of the vehicle 3 pushing from the rear. Thus, for example, actuation of the trailer wheel brakes 17 can be provided when driving downhill 26 above the slope limit α_sw2 or depending on a table that contains data for the respective downslope and the driving speed v; this can be introduced as the fourth criterion K4.

Figure 3:
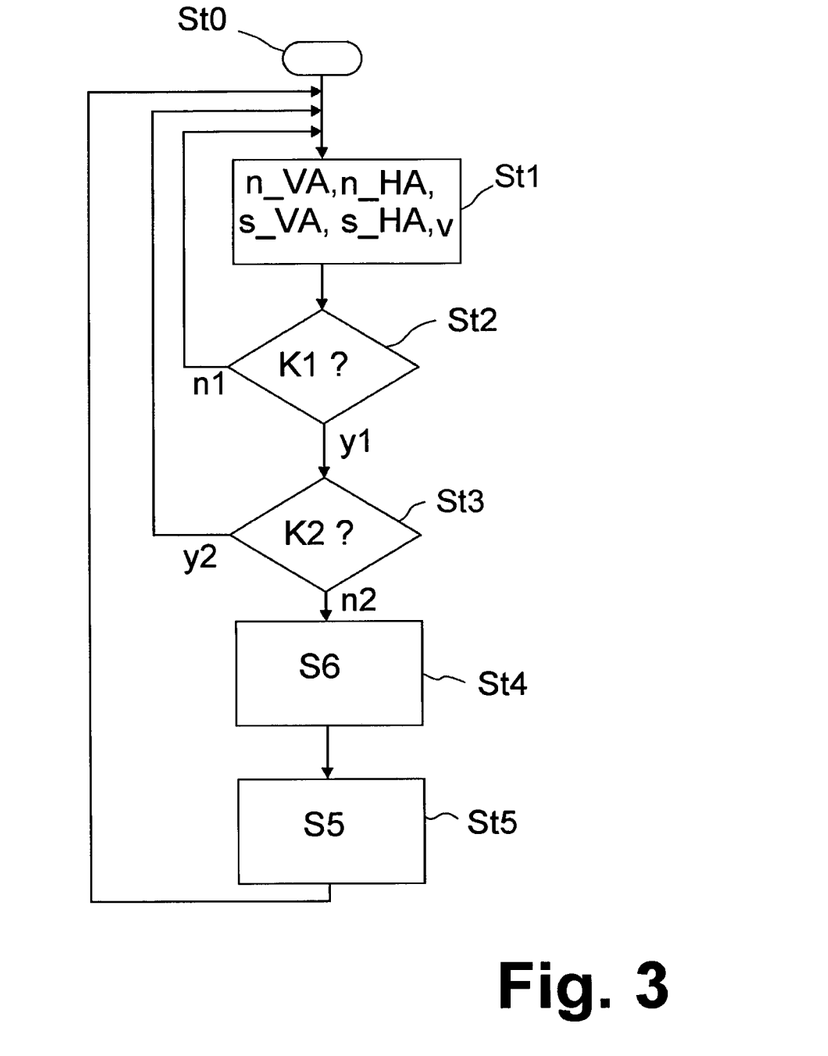
FIG. 3 shows a flow chart of a method according to an embodiment of the invention.

The method according to an embodiment of the invention can thus be described by the flow chart of FIG. 3: Following the Start in step St0, in step St1 the wheel revolution rate signals S2 are received and the wheel revolution rates n_HA of the rear axle HA and the wheel revolution rates n_VA of the front axle VA are detected. During this, separate wheel revolution rates can preferably be determined for the front wheels VA-1 and VA-2 and the rear wheels HA-2, for example n_HA-1 for the left rear wheel HA-1 and n_HA-2 for the right rear wheel HA-2 as well as n_VA-1 for the left front wheel VA-1 and n_VA-2 for the right front wheel VA-2; for simplicity, an axle-averaged value is considered here. Furthermore, in step St1 a vehicle speed v is determined from the wheel revolution rates n_HA and n_VA as a controller-internal reference speed over a relevant period of time, or is even taken or determined from data that is within the vehicle. Furthermore, the wheel slip s_HA of the rear axle and the wheel slip s_VA of the front axle are determined in step St1 as described above.

In the subsequent step St2, the conditions K1a, K1b of the first criterion K1 are checked: is there braking wheel slip at the rear axle HA that is at least larger than a first slip threshold value gs (slip threshold value of the driven axle, in this case the rear axle HA), and is there no operation of a wheel brake (service brake) 7 at the rear axle HA. In doing so, the further conditions K1c, K1d of the first criterion K1 can preferably also be checked in step St2.

If the first criterion K1 is not met, according to FIG. 3 the method is rest according to branch n1 to before step St1. Otherwise, according to y1 the subsequent decision stage St3 is carried out, in which a check is made that the exclusion criterion K2 is not met, i.e. none of the following cases exists: driving uphill 24, driving dynamics control activity. If at least one of the exclusion criteria, i.e. in this case the first exclusion criterion K2a and/or the second exclusion criterion K2b, is met, the method is reset again according to branch y2, otherwise, according to n2 step St4 is carried out.

In step St4 subsequently a braking demand signal S6 is transmitted from the brake control device 6 to the trailer-brake control device 16, so that in step St5 the trailer brake control device 16 outputs trailer brake control signals S5 to the wheel brakes 17 of the trailer front axle AVA and/or the trailer rear axle AHA and thereby brakes the trailer vehicle 3.

The method is subsequently reset to before step St1; the method can thereby constitute a control method that is carried out until the unstable state according to criterion K1 is no longer met.

Figure 4:
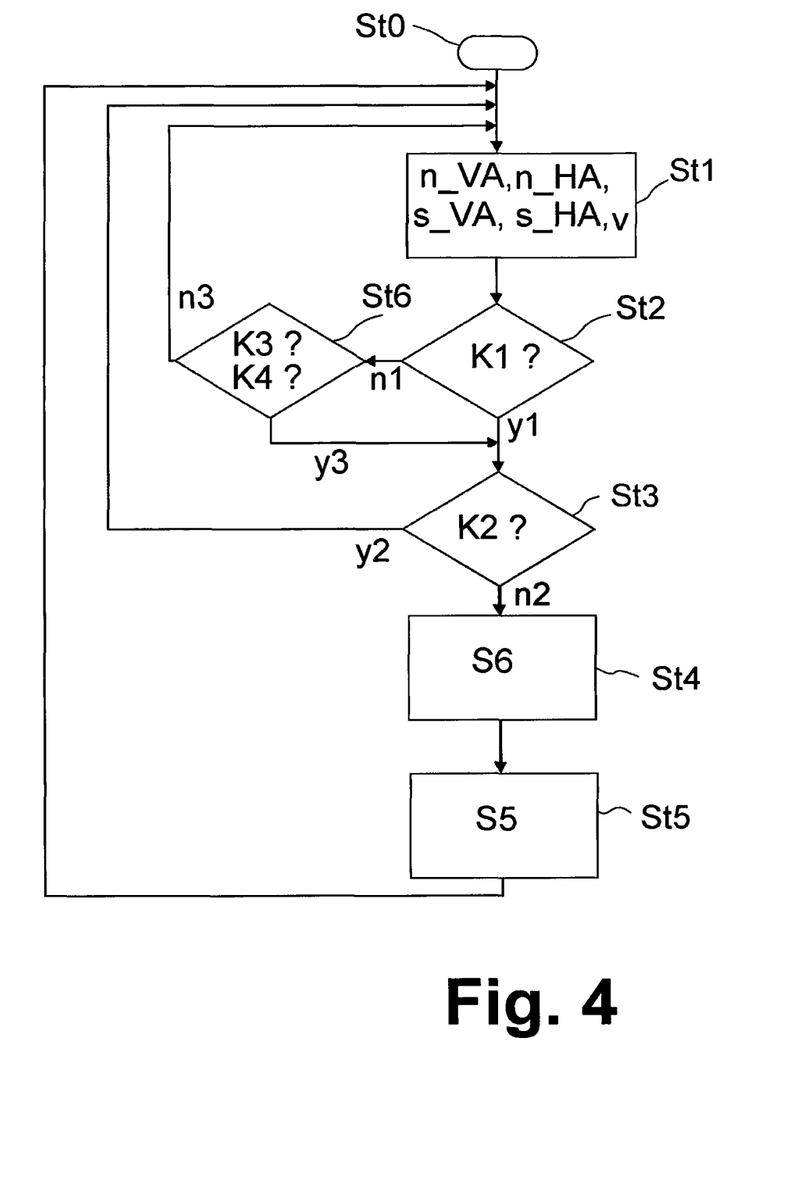
FIG. 4 shows a flow chart of a method according to another embodiment of the invention.

With the embodiment of FIG. 4, for otherwise identical notation as in FIG. 3, in branch n1 the decision stage St6 is carried out, which checks the third criterion K3 and/or the fourth criterion K4. With the third criterion, a check is thereby made as to whether there is an engine braking effect, although in step St2 no relevant braking wheel slip s_HA of the rear axle HA has been determined. Here it can thus be checked according to the above embodiments whether engine braking control signals S3=1 are present or an engine braking effect can be determined from data of the engine controller and of a gearbox actuator. If downhill travel 26 is checked in step St6, here for example based on a table or chart it can be checked whether the fourth criterion K4 is met with the current downslope and at the current vehicle speed v. Thus, on meeting the third criterion K3 and/or the fourth criterion K4, according to branch S3 step St3 is carried out again, otherwise the method is reset again according to n3.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 vehicle combination
2 towing vehicle
3 trailer vehicle
4 highway
5 towing vehicle brake system
6 brake control device
7 wheel brakes
8 wheel revolution rate sensors
9 brake pedal
10 engine-gearbox unit
11 retarder
12 drive shaft
13 trailer coupling
15 trailer brake system
16 trailer brake control devices
17 trailer wheel brakes
18 trailer wheel revolution rate sensors
20 internal pressure sensor of the towing vehicle brake system 5
22 driving on the level
24 uphill travel
26 downhill travel
AVA trailer front axle
AHA trailer rear axle
VA front axle
HA rear axle
VA-1, VA-2 front wheels
HA-1, HA-2 rear wheels
HA-1 left rear wheel
HA-2 right rear wheel
n_VA wheel revolution rates of the front axle
n_HA wheel revolution rates of the rear axle
s_HA wheel slip at the rear axle
s_VA wheel slip at the front axle
v vehicle speed
vr wheel speed
gs first slip threshold value of the driven axle
gs2 second slip threshold value of the non-driven axle
S1 brake control signals
S2 wheel revolution rate signals
S3 engine braking signals
S5 trailer brake control signals
S6 braking demand signals
S7 brake light signal
S8 braking demand signal
K1 first criterion
K1a first condition
K1b second condition
K1c third condition
K1d fourth condition
K2 exclusion criterion K2a first exclusion condition (no uphill travel)
K2b second exclusion condition (no control intervention)
K3 third criterion (engine braking effect)
K4 fourth criterion (downhill travel)
α gradient of the highway 4
α_sw1 gradient threshold
α_sw2 slope limit

The invention claimed is:

1. A method for stabilizing a vehicle combination including a towing vehicle and at least one trailer vehicle, the method comprising:
determining wheel revolution rates of a driven axle of the towing vehicle and a vehicle speed of the towing vehicle;
checking, as a first braking criterion, whether there is braking wheel slip at the driven axle of the towing vehicle without the operation of a wheel brake of the driven axle of the towing vehicle by carrying out a comparison of the vehicle speed of the towing vehicle with a wheel speed determined from the wheel revolution rates of the driven axle;
checking, as an exclusion criterion, whether one or more exclusion conditions are met and
actuating, in response to the first braking criterion being met and the exclusion criterion not being met, at least one wheel brake of the trailer vehicle such that the at least one wheel brake of the trailer vehicle is not actuated when the exclusion condition is met,
wherein the one or more exclusion conditions include a first exclusion condition being a presence of driving uphill and a second exclusion condition being a presence of active driving stability control on the towing vehicle, and
wherein the exclusion criterion is met if at least one of driving uphill and active driving stability control on the towing vehicle is present.

2. The method as claimed in claim 1, wherein the checking, as the first braking criterion, whether there is braking wheel slip at the driven axle of the towing vehicle without the operation of a wheel brake of the driven axle of the towing vehicle further comprises making a check as to whether there is no braking wheel slip or no relevant braking wheel slip at a non-driven axle of the towing vehicle.

3. The method as claimed in claim 1, wherein the checking, as the first braking criterion, whether there is braking wheel slip at the driven axle of the towing vehicle without the operation of the wheel brake of the driven axle of the towing vehicle further comprises determining the presence of one or more of the following conditions:
the presence of an engine braking control signal, the absence of a brake light signal, and the absence of a driver's braking demand signal as determined by a pressure measurement using an internal pressure sensor of the brake system of the towing vehicle.

4. The method as claimed in claim 1, further comprising checking, as a third criterion, whether there is an engine braking control signal for braking the driven axle of the towing vehicle by a drive shaft, and if the engine braking control signal is present, carrying out actuation of at least one wheel brake of the trailer vehicle if the exclusion criteria is not met even if the first braking criterion is also not met.

5. The method as claimed in claim 1, wherein even if the first braking criterion is not met, determining, as a fourth criterion, downhill travel at a constant driving speed, and wherein at least one wheel brake of the trailer vehicle is actuated depending on the fourth criterion.

6. The method as claimed in claim 1, wherein pushing by the trailer vehicle is determined without incorporating data or signals of the trailer vehicle.

7. A towing vehicle brake control device for a towing vehicle of a vehicle combination including the towing vehicle and a trailer vehicle, the towing vehicle brake control device comprising:
a receiver configured to receive wheel revolution rate signals of wheels of axles of the towing vehicle; and
a data connection to a trailer brake control device;
wherein the towing vehicle brake control device is configured to:
check, as a first braking criterion, whether there is braking wheel slip at a driven axle of the towing vehicle without operation of a wheel brake of the driven axle by carrying out a comparison of the vehicle speed of the towing vehicle with a wheel speed determined from the wheel revolution rates of the driven axle,
check, as an exclusion criterion, whether one or more exclusion conditions are met and
output, in response to the first braking criterion being met and the exclusion criterion not being met, a brake demand signal in order to output at least one trailer brake control signal to at least one wheel brake of the trailer vehicle for braking the trailer vehicle such that the at least one wheel brake of the trailer vehicle is not actuated when the exclusion condition is met,
wherein the one or more exclusion conditions include a first exclusion condition being a presence of driving uphill and a second exclusion condition being a presence of active driving stability control on the towing vehicle, and
wherein the exclusion criterion is met if at least one of driving uphill and active driving stability control on the towing vehicle is present.

8. A vehicle combination with a towing vehicle and a trailer vehicle, wherein the towing vehicle comprises:
a towing vehicle brake control device comprising:
a receiver configured to receive wheel revolution rate signals of wheels of axles of the towing vehicle; and
a data connection to a trailer brake control device;
wherein the towing vehicle brake control device is configured to:
check, as a first braking criterion, whether there is braking wheel slip at a driven axle of the towing vehicle without operation of a wheel brake of the driven axle by carrying out a comparison of the vehicle speed of the towing vehicle with a wheel speed determined from the wheel revolution rates of the driven axle,
check, as an exclusion criterion, whether one or more exclusion conditions are met, and
output, in response to the first braking criterion being met and the exclusion criterion not being met, a brake demand signal in order to output at least one trailer brake control signal to at least one wheel brake of the trailer vehicle for braking the trailer vehicle such that the at least one wheel brake of the trailer vehicle is not actuated when the exclusion condition is met,
wherein the one or more exclusion conditions include a first exclusion condition being a presence of driving uphill and a second exclusion condition being a presence of active driving stability control on the towing vehicle, and wherein the exclusion criterion is met if at least one of driving uphill and active driving stability control on the towing vehicle is present.

* * * * *